(12) United States Patent
Radford (10) Patent No.: US 6,585,000 B2
(45) Date of Patent: Jul. 1, 2003

(54) PRESSURE RELIEF VALVE

(76) Inventor: Lydell Radford, 1213 Palmetto St., Pineville, LA (US) 71360

( * ) Notice: Subject to any disclaimer, the term of this patent is extended or adjusted under 35 U.S.C. 154(b) by 98 days.

(21) Appl. No.: 09/946,385

(22) Filed: Sep. 4, 2001

(65) Prior Publication Data

US 2003/0041904 A1 Mar. 6, 2003

(51) Int. Cl.$^7$ ............................................. F16K 15/03
(52) U.S. Cl. ........................ 137/527; 137/514; 251/54; 251/65
(58) Field of Search ............................. 137/514, 526, 137/527; 251/54, 65, 303

(56) References Cited

U.S. PATENT DOCUMENTS

| | | | | |
|---|---|---|---|---|
| 3,177,894 A | * | 4/1965 | Camp | 137/514 |
| 3,294,115 A | * | 12/1966 | Koenigsberg et al. | 137/527 |
| 3,482,603 A | | 12/1969 | Outcalt | 137/515.5 |
| 3,528,453 A | * | 9/1970 | Dunkelis | 137/527.8 |
| 3,817,278 A | | 6/1974 | Elliott | 137/527 |
| 4,188,973 A | * | 2/1980 | Weise et al. | 137/514 |
| 4,253,489 A | | 3/1981 | Schleiter | 137/527 |
| 4,407,325 A | * | 10/1983 | Cherniak | 137/514 |
| 4,669,500 A | | 6/1987 | Strelow | 137/514 |
| 5,099,877 A | * | 3/1992 | Fluegel | 137/527.8 |
| 5,145,005 A | | 9/1992 | Dollison | 166/334 |
| 5,159,981 A | | 11/1992 | Le | 166/325 |
| 5,236,009 A | | 8/1993 | Ackroyd | 137/527 |
| 5,310,005 A | | 5/1994 | Dollison | 166/334 |
| 5,711,341 A | * | 1/1998 | Funderburk et al. | 137/527.2 |
| 5,746,246 A | * | 5/1998 | Yokota et al. | 137/514 |
| 5,769,116 A | * | 6/1998 | Yokota et al. | 137/514 |
| 5,794,655 A | | 8/1998 | Funderburk et al. | 137/527 |
| 5,909,748 A | * | 6/1999 | LaCroix | 137/527 |
| 6,152,173 A | | 11/2000 | Makowan | 137/556.3 |
| 6,227,299 B1 | | 5/2001 | Dennistoun | 166/332.8 |

* cited by examiner

*Primary Examiner*—Michael Powell Buiz
*Assistant Examiner*—Ramesh Krishnamurthy
(74) *Attorney, Agent, or Firm*—R. Keith Harrison (57) ABSTRACT

A pressure relief valve for releasing pressure from a system, which pressure relief valve typically includes a valve housing provided on a pressure relief conduit which receives pressure from the system. A valve opening establishes communication between the valve housing and the pressure relief conduit, and a substantially arcuate valve body is pivotally mounted in the valve housing for sealingly and slidably engaging the valve opening. Accordingly, the valve body is capable of pivoting between a first position to close the pressure relief conduit and a second position to open the pressure relief conduit as the valve body slidably traverses the valve opening. A bias mechanism biases the valve body in the closed position in such a manner that the valve body pivots from the closed position to the open position against the bias mechanism and opens the pressure relief conduit, responsive to a threshold pressure of the pressurized fluid impinging against the valve body in the pressure relief conduit.

22 Claims, 7 Drawing Sheets

FIG. 13

PRESSURE RELIEF VALVE

BACKGROUND OF THE INVENTION

Field of the Invention

This invention relates to pressure relief valves for releasing pressure from a closed system and more particularly, to a pressure relief valve typically including a valve housing provided on a pressure relief conduit which receives the pressure from the system. A valve opening establishes communication between the valve housing and the pressure relief conduit, and a substantially arcuate valve body is pivotally mounted in the valve housing for sealingly and slidably engaging the valve opening. Accordingly, the valve body is capable of pivoting between a first position to close the pressure relief conduit and a second position to open the pressure relief conduit as the valve body slidably traverses the valve opening. A bias mechanism biases the valve body in the closed position in such a manner that the valve body pivots from the closed position to the open position against the bias mechanism and opens the pressure relief conduit, responsive to a threshold pressure impinging against the valve body in the pressure relief conduit.

A pressure relief device, which can be either a pressure relief valve or a rupture disk, is a mechanical device used to prevent a system such as a process unit, piping network, vessel or tank from over-pressurizing. When the system pressurizes to the maximum allowable working pressure or set pressure, the pressure relief device opens responsive to the pressure and relieves the system pressure down to a certain point, after which the pressure relief device closes to prevent further loss of pressure from the system A variety of pressure relief valves have been developed for relieving buildup of pressure from a system Patents of interest in this regard include U.S. Pat. Nos. 3,482,603; 3,817,278; 4,253,489; 4,669,500; 5,145,005; 5,159,981; 5,236,009; 5,310,005; 5,794,655; and 6,152,173.

Many of the conventional, or balanced, pressure relief valves known in the art suffer from numerous disadvantages, including the requirement of a large pressure differential on opposite sides of the valve in order for the valve to stay opened and expel excess pressure. Most of the valves are designed to open at a fixed set pressure and cannot be adjusted to accommodate pressures of various magnitudes in other systems. The valves typically undergo excessive wear, particularly during high-performance operation. Moreover, the valve piston and valve seal are typically disposed directly in the flow path of the pressurized fluid, and this design subjects the piston and seal to continuous impact and accelerated wear when the valve is open. Many of the valves require complicated sizing calculations for installation. Finally, conventional balanced valves tend to close or reseat at about ten percent below the set pressure.

An object of the present invention is to provide a pressure relief valve which is capable of operating with a low pressure drop.

Another object of this invention is to provide a pressure relief valve which is characterized by high performance with low wear characteristics.

Still another object of the invention is to provide a pressure relief valve which can be easily installed and re-used in a variety of systems.

Yet another object of this invention is to provide a pressure relief valve which is capable of a variety of applications.

A still further object of this invention is to provide a pressure relief valve which can be set to open and close at predetermined pressures.

SUMMARY OF THE INVENTION

These and other objects of the invention are provided in a pressure relief valve for releasing pressure from a closed system when the pressure reaches a pretedermined magnitude in the system. The pressure relief valve typically includes a valve housing provided on a pressure relief conduit which receives the pressure from the system A valve opening establishes communication between the valve housing and the pressure relief conduit, and a substantially arcuate valve body is pivotally mounted in the valve housing for sealingly and slidably engaging the valve opening. Accordingly, the valve body is capable of pivoting between a first position to close the pressure relief conduit and a second position to open the pressure relief conduit as the valve body slidably traverses the valve opening. A bias mechanism biases the valve body in the closed position in such a manner that the valve body pivots from the closed position to the open position against the bias mechanism and opens the pressure relief conduit, responsive to a threshold pressure impinging against the valve body in the pressure relief conduit.

BRIEF DESCRIPTION OF THE DRAWINGS

The invention will be better understood by reference to the accompanying drawings, wherein.

DESCRIPTION OF THE PREFERRED EMBODIMENTS

Figure 5:
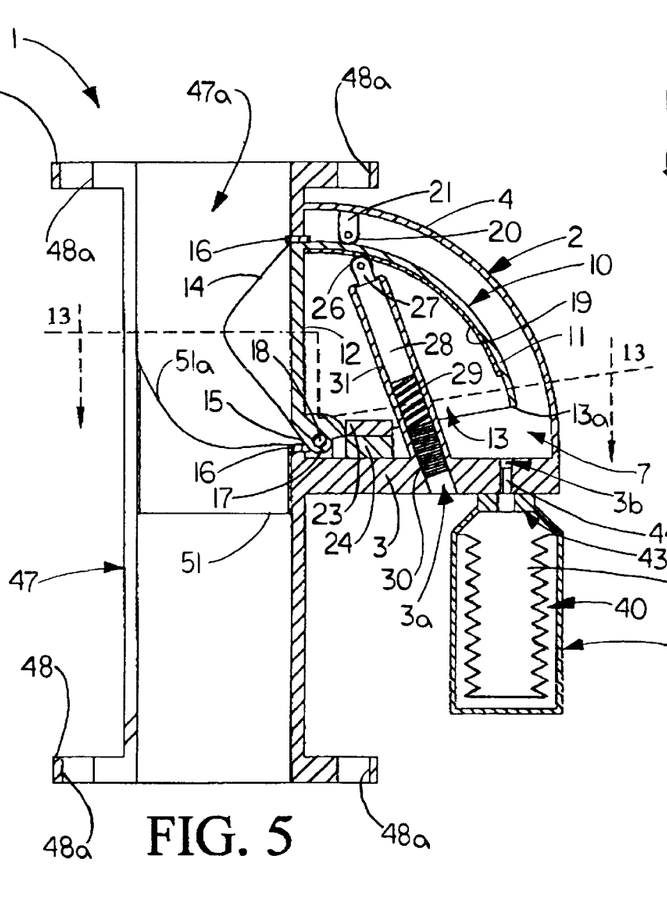
FIG. 5 is a side sectional view, taken along section lies 5—5 in FIG. 3, of the pressure relief valve, with the valve body shown in the open position.
Figure 6:
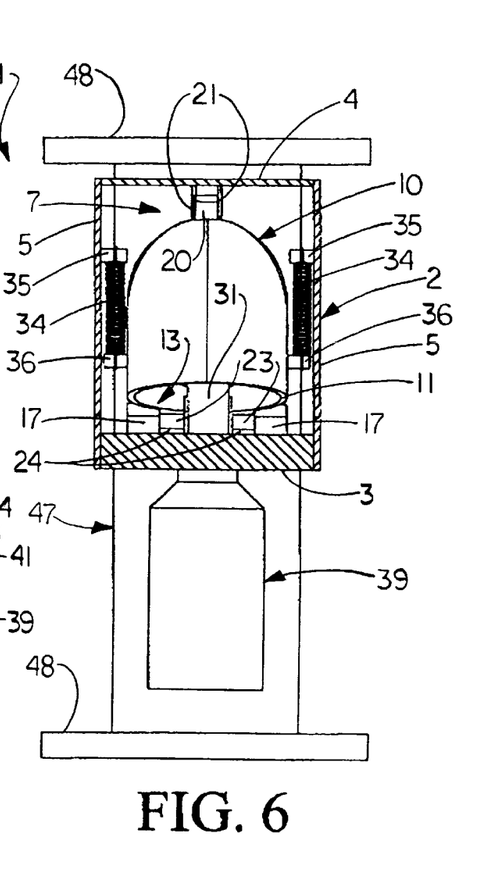
FIG. 6 is a rear sectional view of the pressure relief valve, taken along section lies 6—6 in FIG. 3, with the valve body shown in the open position.

Referring initially to FIGS. 1, 2, 5 and 8 of the drawings, an illustrative embodiment of the pressure relief valve of this invention is generally illustrated by reference numeral 1. The pressure relief valve 1 is designed to be mounted in fluid communication with a closed system such as a chemical storage tank 46, for example, illustrated in phantom in FIG. 1, to periodically release pressure from the system as buildup of pressure in the system reaches a predetermined threshold level above the optimum or desired operating pressure of the system. It is understood that the pressure relief valve 1 can be used to release excess fluid pressure buildup in a variety of applications, and is particularly suitable for releasing pressures in liquid, vapor or two-phase fluid flow process systems. The pressure relief valve 1 includes an elongated, typically cylindrical pressure relief conduit 47, which may be terminated on each end thereof by a relief conduit mount flange 48. In a typical installation of the pressure relief valve 1, the bottom one of the relief conduit mount flanges 48 is attached to a companion base flange 49 of the chemical storage tank 46, typically by means of welding or extending bolts (not illustrated) through registering bolt openings 48a in the respective relief conduit mount flange 48 and base flange 49, respectively, to vertically mount the pressure relief conduit 47 in fluid communication with the chemical storage tank 46. Alternatively, it is understood that the pressure relief conduit 47 can be welded to, formed integrally or threaded, flanged or otherwise connected in fluid communication with the chemical storage tank 46, according to the knowledge of those skilled in the art. A vent pipe 50 can be mounted on the upper one of the relief conduit mount flanges 48 or otherwise mounted on or formed integrally with the pressure relief conduit 47, for purposes hereinafter described. A valve housing 2 is mounted on the pressure relief conduit 47 and, as illustrated in cross-section in FIGS. 5 and 8, contains a valve body 10 which is pivotally mounted in the valve housing 2 and extends through an elliptical valve opening 52 (FIG. 12) in the pressure relief conduit 47 to close and seal the conduit interior 47a of the pressure relief conduit 47 and normally block upward flow of pressure from the chemical storage tank 46, through the conduit interior 47a and out the vent pipe 50 when in the position illustrated in FIG. 8. When pressure of a predetermined threshold magnitude builds up in the chemical storage tank 46 and conduit interior 47a of the pressure relief conduit 47, the pressure pushes upwardly against the valve body 10, thereby pivoting the valve body 10 in the valve housing 2 to open the conduit interior 47a, as illustrated in FIG. 5, and facilitate escape of the pressure through the vent pipe 50, as hereinafter further described.

Figure 11:
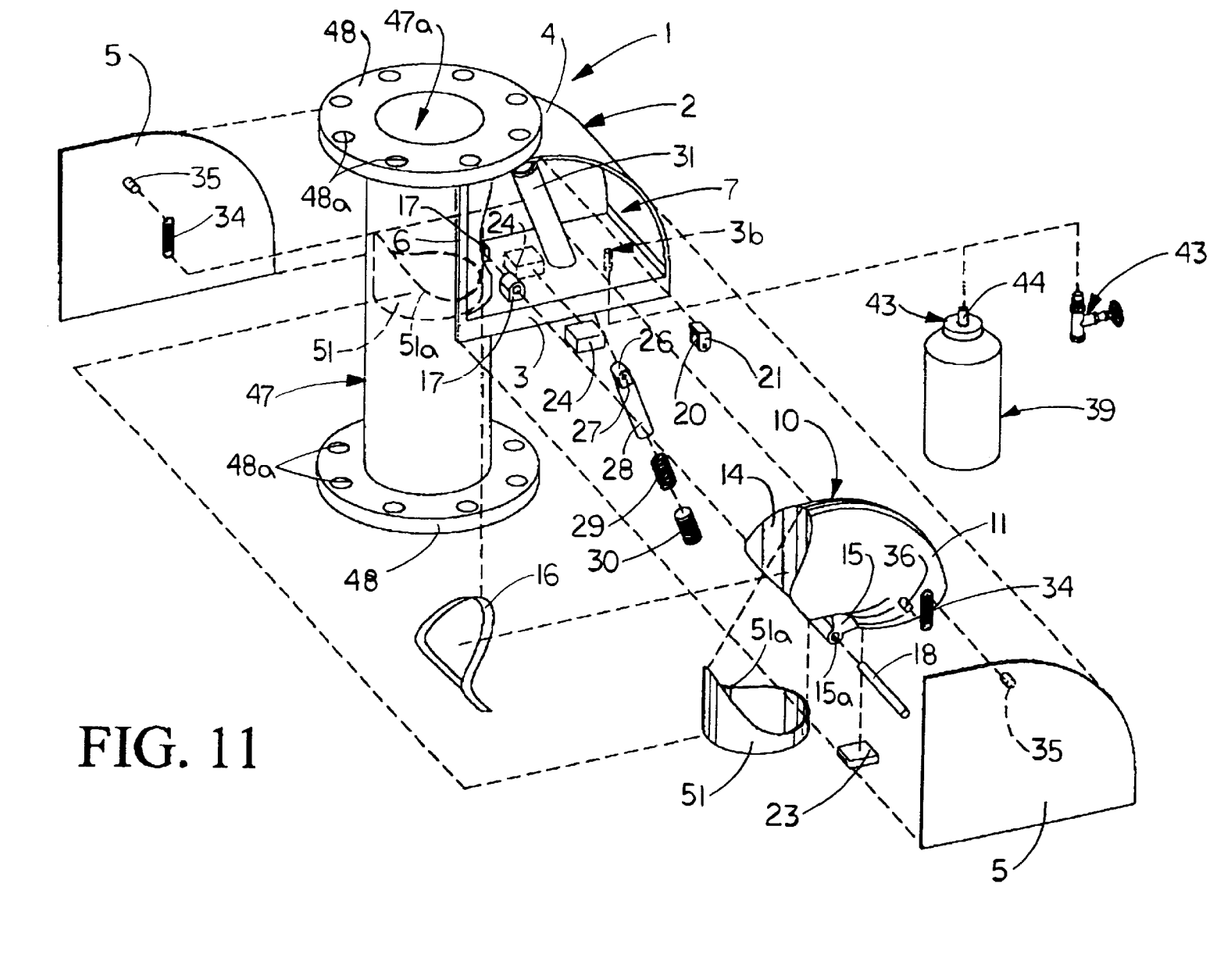
FIG. 11 is an exploded, perspective view of the pressure relief valve.
Figure 12:
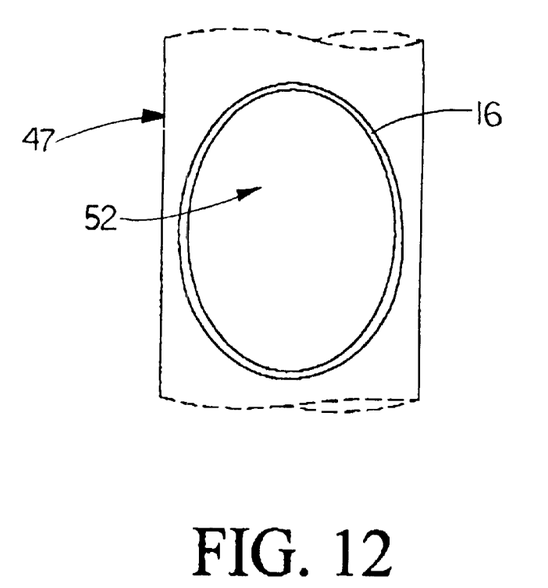
FIG. 12 is a side view, in section, of the pressure relief conduit element of the pressure relief valve, more particularly illustrating a valve opening in the pressure relief conduit.
Figure 13:
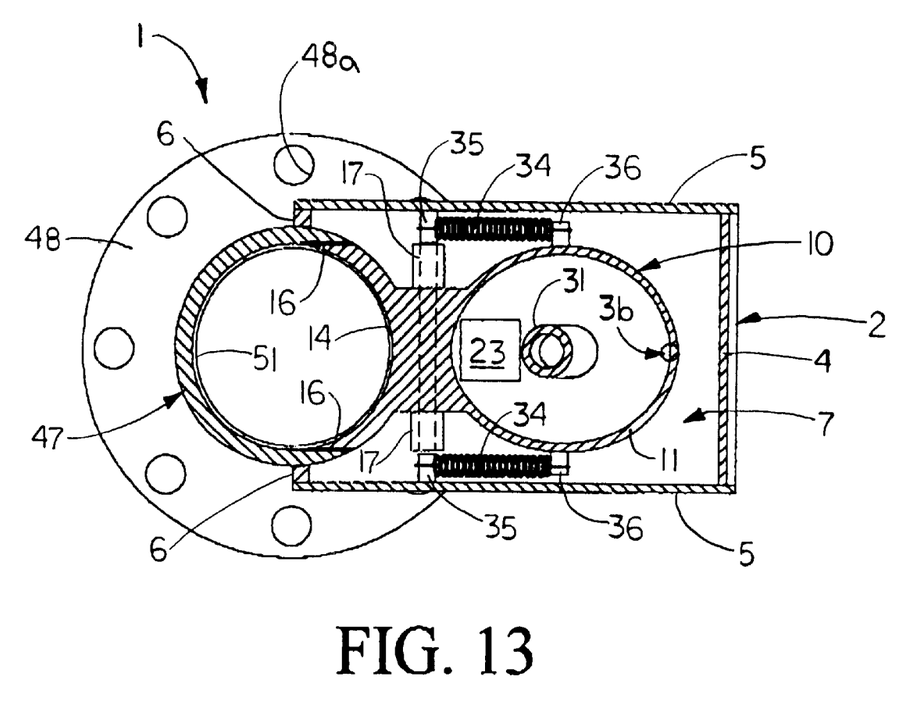
FIG. 13 is a top sectional view, taken along section lines 13—13 in FIG. 5.

Referring next to FIGS. 3–8 and initially to FIGS. 11–13 of the drawings, the valve housing 2 includes a bottom housing panel 3 which extends horizontally outwardly from typically welded attachment to the exterior surface of the pressure relief conduit 47, beneath the valve opening 52 (FIG. 12). The secured front edge of the bottom housing panel 3 is provided with an arcuate notch (not illustrated) which receives the complementary curved exterior surface of the pressure relief conduit 47. A curved rear housing panel 4 arcs upwardly from the rear edge of the bottom housing panel 3, and the front edge of the rear housing panel 4, like the front edge of the bottom housing panel 3, includes a curved notch (not illustrated) which receives the complementary curved exterior surface of the pressure relief conduit 47, above the valve opening 52 and is typically welded or otherwise attached to the pressure relief conduit 47. A side housing panel 5 is mounted on the bottom housing panel 3 and the rear housing panel 4 on each side of the valve housing 2, and a front housing panel segment 6 extends inwardly from the front edge of each side housing panel 5 and is attached to the pressure relief conduit 47, on respective sides of the valve opening 52. Accordingly, the bottom housing panel 3, the rear housing panel 4, the side housing panels 5 and the front housing panel segments 6 enclose a housing interior 7 of the valve housing 2, and the valve opening 52 of the pressure relief conduit 47 establishes communication between the conduit interior 47a and the housing interior 7 of the valve housing 2.

As further illustrated in FIG. 11, the valve body 10, pivotally mounted in the housing interior 7 of the valve housing 2 as hereinafter described, typically includes a valve apex 15, traversed by a transverse hinge pin opening 15a and having a curved valve wall 11 extending from the valve apex 15 to define the arcuate valve body 10. As illustrated in FIG. 5, a front portion 12 of the valve wall 11 joins the valve apex 15, and the valve wall 11 defines a valve interior 13 which is open through the rear end of the valve body 10. A controller pin 19, characterized in one embodiment by a narrow, elongated protrusion of the interior surface of the valve wall 11 into the valve interior 13, extends rearwardly from the front portion 12 of the valve wall 11 and terminates in spaced-apart relationship to the rear opening 13a of the valve interior 13, for purposes hereinafter described. In another embodiment, the controller pin 19 is characterized by an elongated, typically rectangular strip of metal which is curved to fit on the interior surface of the valve wall 11, and may be friction-fitted or otherwise removably mounted in a pin groove (not illustrated) provided in the valve wall 11 for replacement on the valve body 10, as deemed necessary. A resilient valve flap 14, typically constructed of neoprene or other suitable non-corrosive, flexible rubber or plastic material, is provided on the exterior surface of the front portion 12 of the valve wall 11 and in one embodiment defines a cancave or saddle-shaped front surface of the valve body 10, as illustrated in FIG. 11. In another embodiment, the valve flap 14 defines a flat, rather than a concave, front surface of the valve body 10. A cynical valve shoulder 51, characterized by a valve seat 51a that is contoured to match the saddle-shaped or flat outline of the valve flap 14 of the valve body 10, is shaped or inserted in the conduit interior 47a for sealingly engaging the valve flap 14 as hereafter described.

A pair of spaced-apart valve mount hinges 17, each traversed by a hinge opening (not illustrated), is provided on the bottom housing panel 3 inside the housing interior 7 and immediately adjacent to the valve opening 52 of the pressure relief conduit 47. The valve body 10 is pivotally mounted in the housing interior 7 of the valve housing 2 typically by means of an elongated hinge pin 18, which extends through the hinge pin opening 15a of the valve body 10 and is seated in registering hinge openings (not illustrated) provided in the respective valve mount hinges 17. An elliptical valve seal 16, typically constructed of neoprene or other suitable, non-corrosive rubber or plastic, is fitted along the edge of the valve opening 52, and the valve body 10 extends through the valve opening 52 and slidably engages the valve seal 16.

Figure 4:
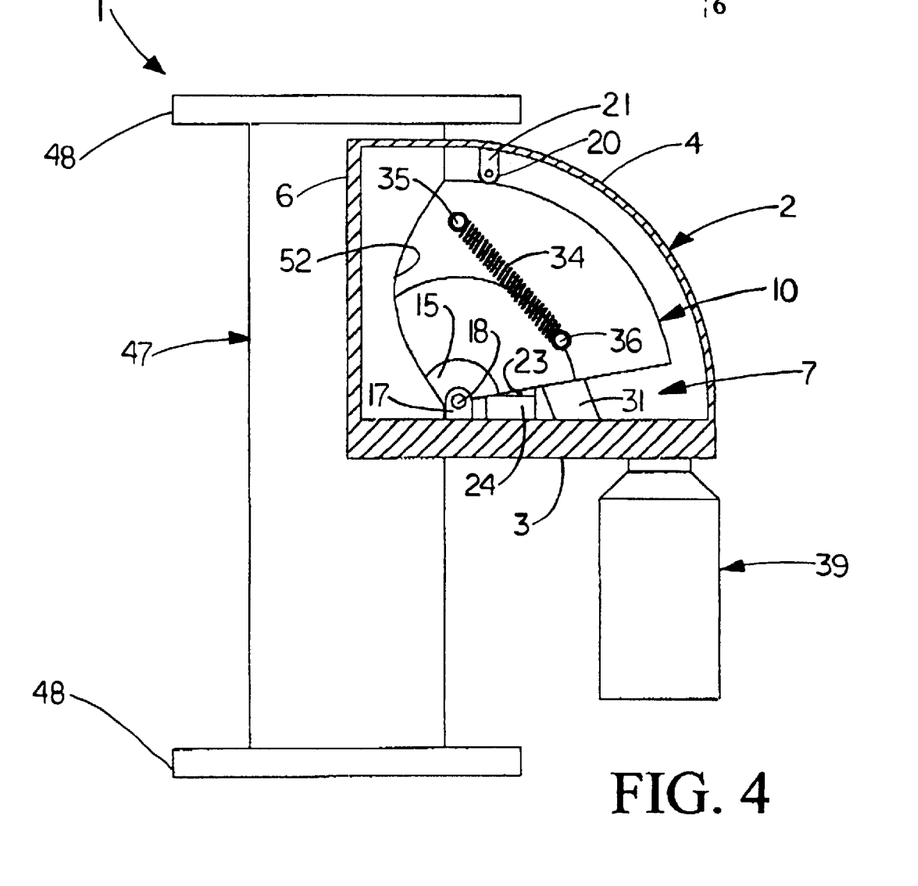
FIG. 4 is a side sectional view, taken along section lines 4—4 in FIG. 3, of the pressure relief valve, with the valve body component of the pressure relief valve shown in the open position.
Figure 7:
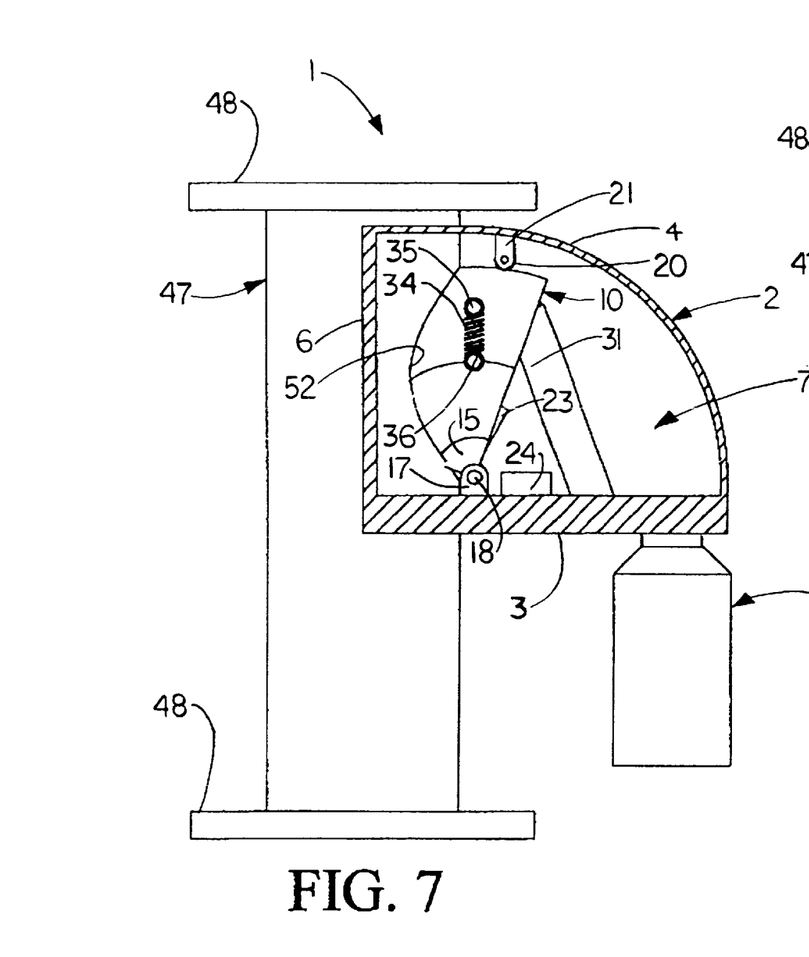
FIG. 7 is is a side sectional view, taken along section lines 4—4 in FIG. 3, of the pressure relief valve, with the valve body shown in the closed, conduit-sealing position.
Figure 8:
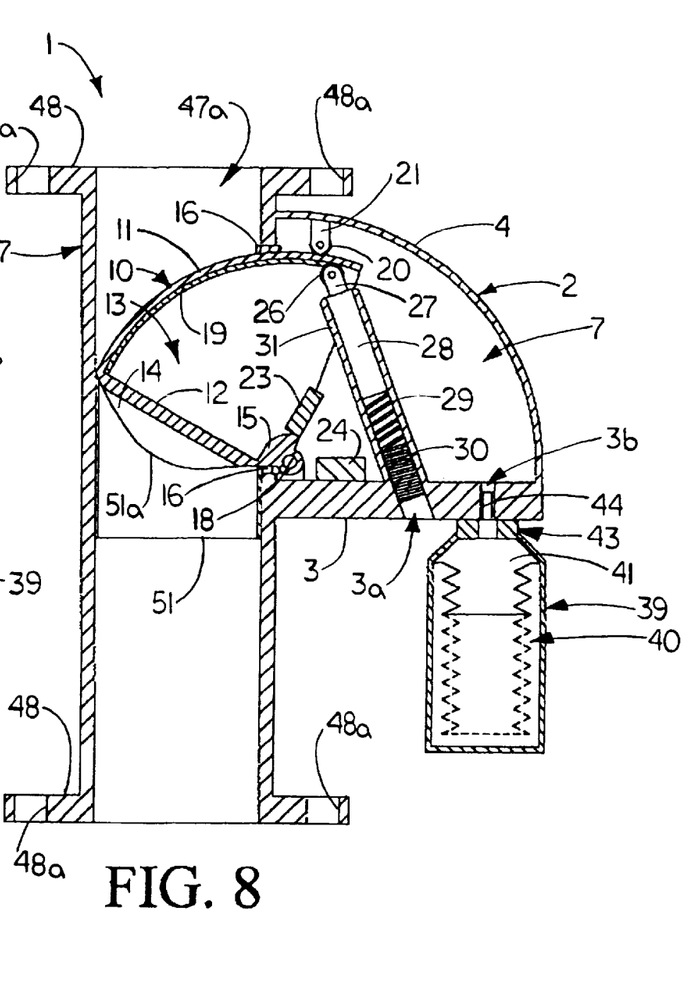
FIG. 8 is a sectional view, taken along section lines 5—5 in FIG. 3, of the pressure relief valve, with the valve body shown in the closed position.

Accordingly, the valve body 10 is capable of pivoting in the housing interior 7 between the conduit-closing and sealing configuration illustrated in FIGS. 7 and 8, wherein the valve flap 14 of the valve body 10 is seated against the congruent valve seat 51a of the valve shoulder 51, and the open configuration illustrated in FIGS. 4 and 5, wherein the valve flap 14 is unseated from the valve seat 51a of the valve shoulder 51 and completes the cylindrical wall of the pressure relief conduit 47 at the valve opening 52 thereof as illustrated in FIG. 13. As the valve body 10 pivots between the conduit-sealing configuration illustrated in FIGS. 7 and 8 and the open configuration illustrated in FIGS. 4 and 5, the valve seal 16, in conjunction with the valve body 10, continually provides a fluid-tight seal between the housing interior 7 of the valve housing 2 and the conduit interior 47a of the pressure relief conduit 47. In another embodiment (not illustrated), the valve body 10 is pivotally mounted on the valve housing 2 by means of a contact hinge.

As further illustrated in FIGS. 11 and 13, a housing spring mount peg 35 extends from each side housing panel 5 into the housing interior 7 and receives one end of a corresponding valve closing spring 34, the other end of which engages a corresponding valve spring mount peg 36 that extends from the corresponding side of the valve body 10. Accordingly, the valve closing springs 34, normally disposed in the contracted configuration illustrated in FIG. 7, bias the valve body 10 in the closed, conduit-sealing configuration illustrated in FIGS. 7 and 8. Conversely, the valve body 10 pivots to the open configuration illustrated in FIGS. 5 and 13 against tension imparted by the stretching valve closing springs 34, as the valve spring mount pegs 36 of the pivoting valve body 10 move downwardly away from the respective stationary housing spring mount pegs 35 of the valve housing 2. In another embodiment, only one valve closing spring 34 connects the valve body 10 to the valve housing 2, and the valve closing spring 34 may be fitted with an adjustment screw (not illustrated) for adjusting tension on the closing spring 34, as deemed necessary.

In one embodiment of the pressure relief valve 1, a housing magnet 24 is provided on the bottom housing panel 3 rearwardly of the valve mount hinges 17, and a companion valve magnet 23 of opposite polarity is provided on the valve apex 15 of the valve body 10, in facing relationship to the housing magnet 24. Accordingly, as illustrated in FIG. 5, when the valve body 10 is disposed in the open configuration in the housing interior 7, the housing magnet 24 attracts the valve magnet 23, thus facilitating rapid and complete "popping" or opening of the valve body 10 in the conduit interior 47a in application of the pressure relief valve 1 as hereinafter described.

As further illustrated in FIG. 5, a valve guide roller 20, the purpose of which will be hereinafter described, is rotatably mounted between a pair of roller mount flanges 21 which extend downwardly from the rear housing panel 4 into the housing interior 7 of the valve housing 2, and the valve guide roller 20 engages the curved exterior surface of the valve wall 11 of the valve body 10. A cylindrical spring housing 31 extends upwardly at an angle from the bottom housing panel 3, into the housing interior 7 of the valve housing 2 and terminates in the valve interior 13 of the valve body 10. A cylindrical roller mount rod 28 is slidably disposed in the hollow interior of the spring housing 31, and the upper end of the roller mount rod 28 is fitted with a pressure roller 26 which is rotatably mounted between a pair of roller mount flanges 27 and extends from the upper end of the spring housing 31. The open lower end of the spring housing 31 communicates with a screw access opening 3a provided in the bottom housing panel 3 of the valve housing 2, which screw access opening 3a threadibly receives a pressure adjustment screw 30. A pressure adjustment spring 29 in the spring housing 31 is interposed between the pressure adjustment screw 30 and the lower end of the roller mount rod 28. Accordingly, when the valve body 10 is disposed in the conduit-sealing configuration illustrated in FIG. 8, the pressure roller 26 abuts against the rear end of the controller pin 19 in the valve body 10, with a pressure corresponding to tension imparted against the roller mount rod 28 by the pressure adjustment spring 29 and the pressure adjustment screw 30. As the valve body 10 pivots to the open configuration of FIG. 5, the pressure roller 26 rolls onto the controller pin 19 and traverses substantially the entire arc of the controller pin 19, applying a constant tension to the valve body 10. The tension of the pressure roller 26 against the rear end of the controller pin 19 determines the ease with which the valve body 11 pivots from the closed to the open position, with a greater tension of the pressure roller 26 against the rear end of the controller pin 19 requiring a correspondingly greater magnitude of the pressure against the valve flap 14 in the conduit interior 47a to overcome the resistance of the pressure roller 26 against the rear end of the controller pin 19 and roll the pressure roller 26 onto the controller pin 2 as the valve body 10 commences pivoting to the open position. Accordingly, it will be appreciated by those skilled in the art that the set pressure, or magnitude of the pressure which is required to pivot the valve body 10 from the closed, conduit 20 sealing position to the open position, can be selectively increased or decreased by manipulation of the pressure adjustment screw 30. This is accomplished by threading the pressure adjustment screw 30 upwardly in the spring housing 31 to compress the pressure adjustment spring 29 against the roller mount rod 28, which slides upwardly in the spring housing 31 to increase tension of the pressure roller 26 against the controller pin 19, thereby increasing the opening or set pressure for the valve body 10. Conversely, threading of the pressure adjustment screw 30 downwardly in the spring housing 31 decreases tension of the pressure roller 26 against the controller pin 19, and this decreases the opening or set pressure for the valve body 10. The valve guide roller 20 ensures smooth pivoting of the valve body 10 in conjunction with the pressure roller 26, between the conduit-sealing configuration and the open configuration. It is understood that the controller pin 19 can have various configurations on the surface against which the pressure roller 26 traverses. Accordingly, as the valve body 10 opens, the pressure roller 26 encounters the various configurations on the controller pin 19 and this, in turn, determines the opening speed and other characteristics of the valve body 10.

Figure 9:
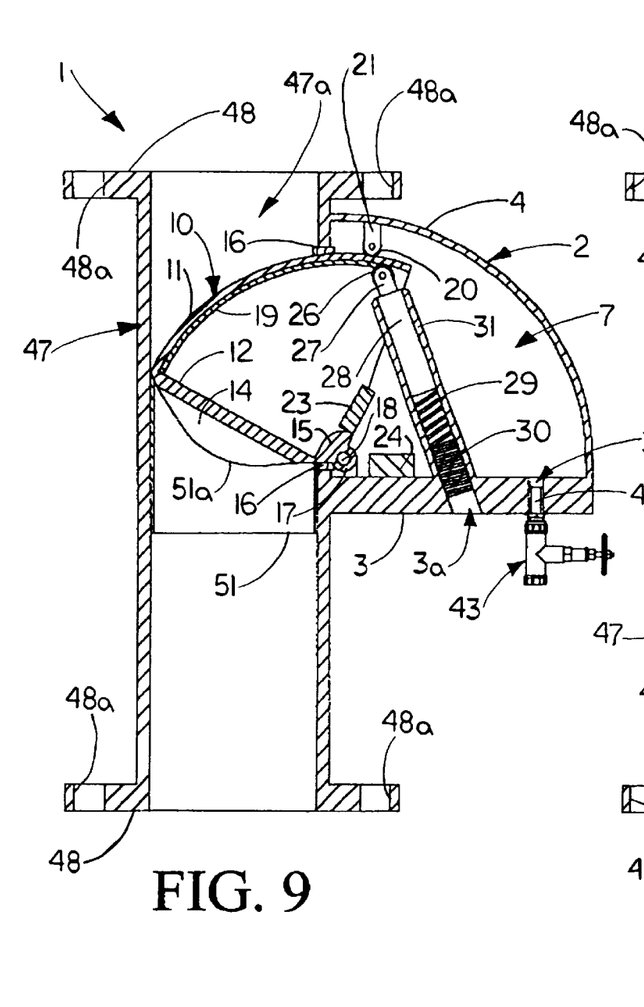
FIG. 9 is a sectional view, taken along section lines 5—5 in FIG. 3, of the pressure relief valve, with the valve body shown in the closed position, more particularly illustrating an optional pressure/vacuum relief valve provided on the valve housing in place of the breather.
Figure 10:
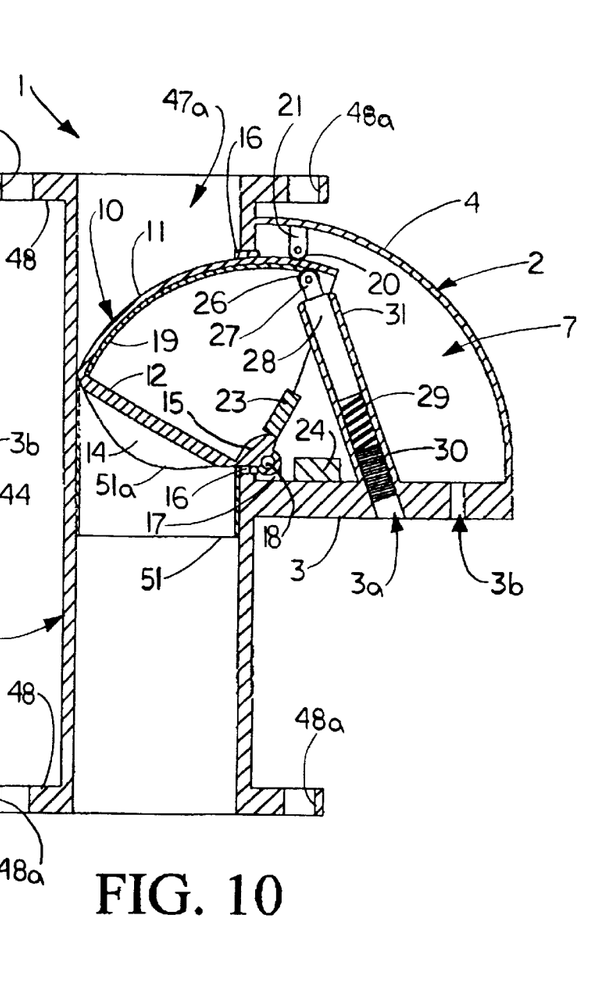
FIG. 10 is a sectional view, taken along section lines 5—5 in FIG. 3, of the pressure relief valve, with the valve body shown in the closed position and the pressure/vacuum relief valve of FIG. 9 removed from the valve housing.

Referring again to FIGS. 5, 8, 9, 11 and initially to FIG. 10 of the drawings, a relief vent opening 3b typically extends through the bottom housing panel 3 of the valve housing 2 for alternately relieving air pressure and vacuum pressure in the housing interior 7 during operation of the pressure relief valve 1 as hereinafter described. As illustrated in FIGS. 9 and 11, in another application of the pressure relief valve 1, the relief vent opening 3b receives the valve nipple 44 of an optional pressure/vacuum relief valve 43 which can be used to adjust the rate of air pressure and vacuum relief in the housing interior 7. In still another application of the pressure relief valve 1, illustrated in FIGS. 5 and 11, an optional breather 39, having a breather diaphragm 41 contained in the interior 40 of the breather 39, can be provided on a pressure/vacuum relief valve 43 in the relief vent opening 3b to isolate the housing interior 7 of the valve housing 2 from corrosive and dirty surroundings and relieve air and vacuum pressure in the housing interior 7, as hereinafter described.

Figure 1:
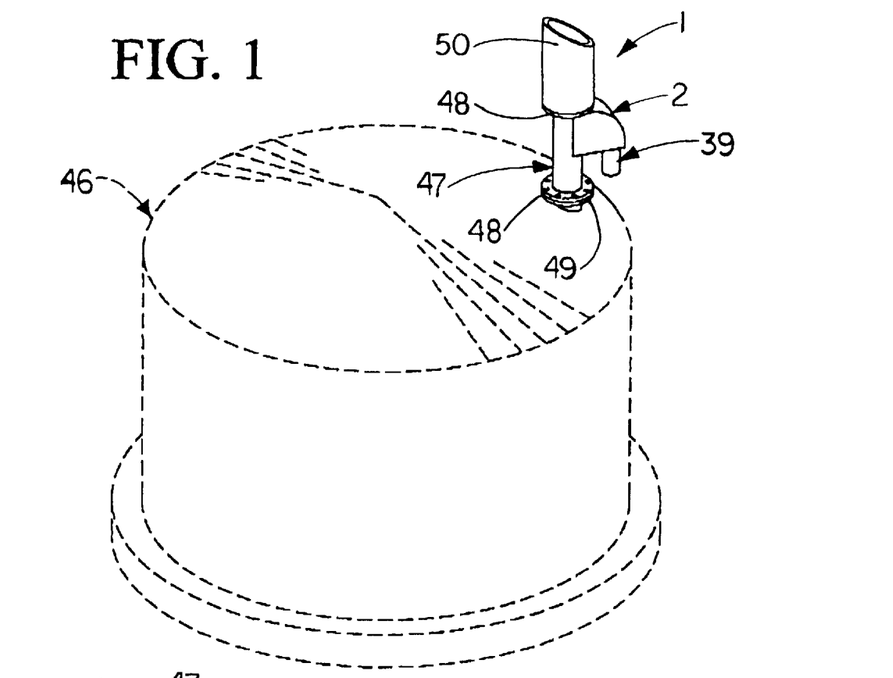
FIG. 1 is a perspective view of a chemical storage tank (illustrated in phantom), with an illustrative embodiment of the pressure relief valve of this invention provided on the tank for relieving pressure buildup from the tank in typical application.
Figure 2:
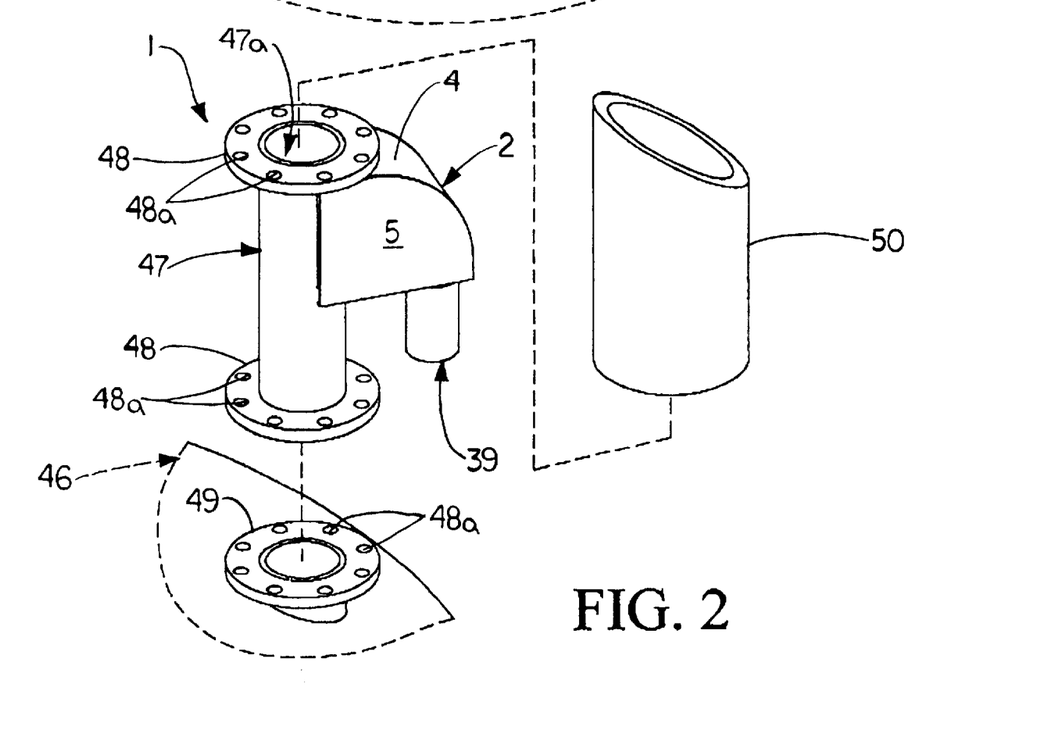
FIG. 2 is an exploded, perspective view of the pressure relief valve illustrated in FIG. 1, with a breather shown optionally mounted on the pressure relief valve.
Figure 3:
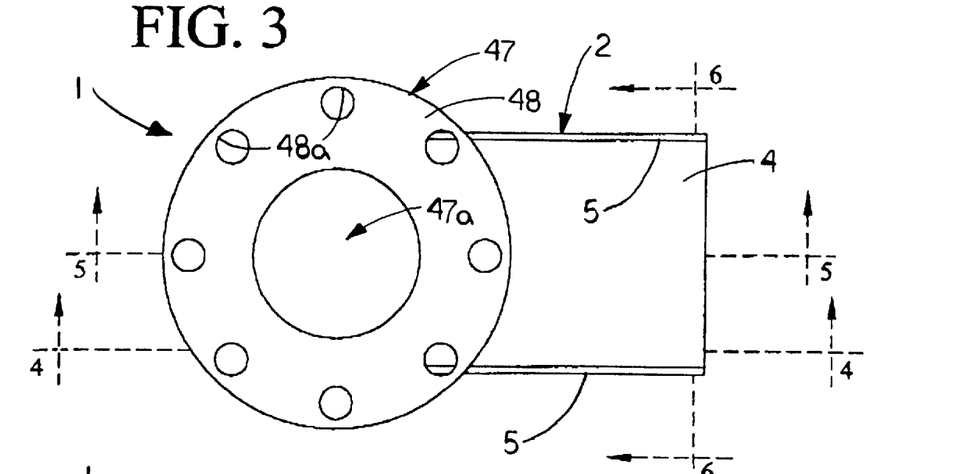
FIG. 3 is a top view of the pressure relief valve.

Referring again to FIGS. 1, 5, 8 and 13 of the drawings, the pressure relief valve 1 is capable of relieving pressure from a variety of process systems, including atmospheric pressure, low pressures or high pressures in liquid, vapor or two-phase liquid flow systems to prevent over-pressurization of the system and damage to system components. Upon pressurization of the system to the maximum allowable working pressure or set pressure, the pressure relief valve 1 relieves the system pressure down to a predetermined optimum level. While the pressure relief valve 1 can be used to relieve pressure in process units of various structure having a piping network, vessel or tank, for example, in typical application the pressure relief valve 1 is used to relieve pressure from a chemical storage tank 46, as illustrated in FIG. 1. Accordingly, during system operation, pressure in the chemical storage tank 46 equalizes throughout the chemical storage tank 46 and the conduit interior 47a of the pressure relief conduit 47, and as the pressure increases in the chemical storage tank 46 and the conduit interior 47a, the pressure impinges against the valve flap 14 of the valve body 10 until the upward pressure against the valve body 10 counterbalances the combined closing tension imparted on the valve body 10 by the valve closing springs 34 and the pressure roller 26 against the rear end of the controller pin 19. At that point, the pressure in the conduit interior 47a equals or exceeds the set pressure for the pressure relief valve 1, which set pressure is determined by the degree of tension imparted by the pressure roller 26 against the rear end of the controller pin 19, and this tension is selected by threading or unthreading the pressure adjustment screw 30 in the spring housing 31, as heretofore described. Accordingly, the valve body 10 pivots from the conduit-sealing position illustrated in FIG. 8 to the open position in the housing interior 7 of the valve housing 2, as illustrated in FIG. 5, thereby unseating the valve flap 14 from the valve seat 51a as the pressure roller 26 rolls onto the controller pin 19 in the valve interior 13 of the valve body 10 and applies a constant tension against the controller pin 19. Simultaneously, the housing magnet 24 on the valve housing 2, by attracting the valve magnet 23 on the valve body 11, causes the valve body 10 to open rapidly and completely, or "pop". Because the concave valve flap 14 of the open valve body 10 completes the cylindrical wall contour of the pressure relief conduit 47 at the valve opening 52 (FIG. 12) thereof, as illustrated in FIG. 13, the open valve body 10 permits substantially unimpeded upward escape of the pressure in the conduit interior 47a, beyond the valve seat 51a and out of the system through the vent pipe 50. Premature closing of the valve body 10 is prevented by operation of the valve magnet 23 and housing magnet 24. When the pressure of the fluid in the chemical storage tank 46 and the conduit interior 47a subsides to within the optimum or preset operating parameters of the system, the valve body 10 pivots in the housing interior 7 back to the conduit-sealing configuration of FIG. 8 by operation of the valve closing springs 34, as the valve magnet 23 of the valve body 10 disingages the housing magnet 24 of the valve housing 2. The valve flap 14 of the valve body 10 again seats against the congruent valve seat 51a of the valve shoulder 51, thereby preventing further flow of the pressure upwardly in the conduit interior 47a, beyond the valve seat 51a and out the system through the vent pipe 50.

Referring again to FIGS. 5 and 8–10 of the drawings, as the valve body 10 pivots from the closed, conduit-sealing position to the open position, air pressure in the housing interior 7 increases, and air normally contained in the housing interior 7 flows to the atmosphere through the relief vent opening 3b of the pressure relief valve 1 illustrated in FIG. 10. As the valve body 10 subsequently returns to the closed, sealing position, a partial vacuum is generated in the housing interior 7, and air is drawn from the atmosphere, back into the housing interior 7 through the relief vent opening 3b to relieve the vacuum pressure in the housing interior 7. Under circumstances in which the relief vent opening 3b is fitted with the pressure/vacuum relief valve 43, as illustrated in FIG. 9 and heretofore described, air pressure and vacuum pressure in the housing interior 7 is relieved through the pressure/vacuum relief valve 43. Still further in the alternative, when the breather 39 is fitted on the valve housing 2, rising air pressure in the housing interior 7 is relieved by flowing of air into the expanding breather diaphragm 41 through the pressure/vacuum relief valve 43 as the valve body 10 opens, as illustrated in FIG. 5, whereas vacuum pressure in the housing interior 7 is relieved by flowing of air from the contracting breather diaphragm 41 into the housing interior 7 upon subsequent closure of the valve body 10 in the conduit interior 47a, as illustrated in FIG. 8 and heretofore described. The increasing air pressure in the housing interior 7, encountered by the opening valve body 10, tends to slow the opening speed of the valve body 10 and thus, prevents the valve body 10 from slamming in place into the open position. Likewise, the partial vacuum exerted on the valve body 10 as the valve body 10 closes prevents the valve body 10 from slamming against the valve seat 51a.

It will be appreciated by those skilled in the art that by adjustment of the pressure/vacuum relief valve 43 of the pressure relief valve 1 illustrated in FIGS. 8 and 9, the rate of pressure and vacuum relief in the housing interior 7 can be adjusted to vary how hard or how soft the valve body 10 seats in the open position in the housing interior 7 of the valve housing 2 upon opening of the valve body 10, as well as how hard or how soft the valve flap 14 of the valve body 10 seats on the valve seat 51a of the valve shoulder 51 upon closing, as desired. The rate of pressure and vacuum relief in the housing interior 7 of the pressure relief valve 1 illustrated in FIG. 10 can in like manner be adjusted for the same purpose by varying the diameter of the relief vent opening 3b. It will be further appreciated by those skilled in the art that pressure relief valve 1 of this invention is totally balanced, and as a result, the downstream or discharge pressure of the system will not affect the opening or set pressure of the pressure relief valve 1. This is in contrast to conventional bellows-operated valves, the opening or set pressure of which is affected by the downstream or discharge pressure of the system While the preferred embodiments of the invention have been described above, it will be recognized and understood that various modifications can be made in the invention and the appended claims are intended to cover all such modifications which may fall within the spirit and scope of the invention.

Having described my invention with the particularity set forth above, what is claimed is:

1. A pressure relief valve for releasing pressure from a system, comprising:
   a valve housing;
   a pressure relief conduit provided on said valve housing for fluid communication with the system, said pressure relief conduit having a conduit interior for receiving the pressure and a valve opening between said valve housing and said conduit interior;

a substantially arcuate valve body pivotally mounted in said valve housing for sealingly engaging said valve opening;

wherein said valve body is capable of pivoting in said valve housing between a first position for closing said conduit interior of said pressure relief conduit and a second position for opening said conduit interior of said pressure relief conduit as said valve body slidably traverses said valve opening and continually seals said valve housing from said conduit interior; and a bias mechanism carried by said valve housing and operably engaging said valve body for biasing said valve body in said first position, whereby said valve body pivots from said first position to said second position against said bias mechanism and opens said pressure relief conduit responsive to a threshold magnitude of the pressure against said valve body.

2. The pressure relief valve of claim 1 comprising a relief vent opening provided in said valve housing for releasing vacuum pressure and air pressure from said valve housing.

3. The pressure relief valve of claim 1 wherein said bias mechanism comprises at least one valve closing spring engaging said valve housing and said valve body.

4. The pressure relief valve of claim 3 comprising a relief vent opening provided in said valve housing for releasing vacuum pressure and air pressure from said valve housing.

5. The pressure relief valve of claim 2 comprising a breather provided in fluid communication with said relief vent opening.

6. The pressure relief valve of claim 5 comprising a pressure/vacuum relief valve provided in fluid communication with said relief vent opening and wherein said breather is provided in fluid communication with said pressure/vacuum relief valve.

7. The pressure relief valve of claim 5 wherein said bias mechanism comprises at least one valve closing spring engaging said valve housing and said valve body.

8. The pressure relief valve of claim 7 comprising a pressure/vacuum relief valve provided in fluid communication with said relief vent opening and wherein said breather is provided in fluid communication with said pressure/vacuum relief valve.

9. The pressure relief valve of claim 1 comprising a pressure adjustment mechanism adjustably engaging said valve body for adjustably tensioning said valve body in said first position.

10. The pressure relief valve of claim 9 comprising a relief vent opening provided in said valve housing for releasing vacuum pressure and air pressure from said valve housing.

11. The pressure relief valve of claim 9 wherein said bias mechanism comprises at least one valve closing spring engaging said valve housing and said valve body.

12. The pressure relief valve of claim 11 comprising a relief vent opening provided in said valve housing for releasing vacuum pressure and air pressure from said valve housing.

13. The pressure relief valve of claim 10 comprising a breather provided in fluid communication with said relief vent opening.

14. The pressure relief valve of claim 13 comprising a pressure/vacuum relief valve provided in fluid communication with said relief vent opening and wherein said breather is provided in fluid communication with said pressure/vacuum relief valve.

15. The pressure relief valve of claim 13 wherein said bias mechanism comprises at least one valve closing spring engaging said valve housing and said valve body.

16. The pressure relief valve of claim 15 comprising a pressure/vacuum relief valve provided in fluid communication with said relief vent opening and wherein said breather is provided in fluid communication with said pressure/vacuum relief valve.

17. The pressure relief valve of claim 2 comprising a pressure/vacuum relief valve provided in fluid communication with said relief vent opening for selectively releasing vacuum pressure and air pressure from said valve housing.

18. A pressure relief valve for releasing pressure from a system, comprising:

a pressure relief conduit for fluid communication with the system and having a conduit interior for receiving the pressure and a valve opening provided in said pressure relief conduit;

a valve housing provided on said pressure relief conduit in communication with said valve opening;

a substantially arcuate valve body pivotally mounted in said valve housing and sealingly engaging said valve opening, said valve body having a curved exterior surface and a curved interior surface;

wherein said valve body is capable of pivoting through said valve opening between a first position for closing said conduit interior of said pressure relief conduit and a second position for opening said conduit interior of said pressure relief conduit;

a bias mechanism carried by said valve housing and operably engaging said valve body for biasing said valve body in said first position, whereby said valve body pivots from said first position to said second position against said bias mechanism and opens said pressure relief conduit responsive to a threshold magnitude of the pressure against said valve body;

a pressure roller engaging said interior surface of said valve body for traversing said interior surface of said valve body as said valve body pivots between said first position and said second position; and a pressure adjustment mechanism operably engaging said pressure roller for biasing said pressure roller against said interior surface of said valve body.

19. The pressure relief valve of claim 18 wherein said bias mechanism comprises at least one valve closing spring engaging said valve housing and said valve body.

20. The pressure relief valve of claim 18 comprising a controller pin provided on said interior surface of said valve body and wherein said pressure roller engages said controller pin.

21. A pressure relief valve for releasing pressure from a system, comprising:

a pressure relief conduit for fluid communication with the system and having a conduit interior for receiving the pressure and a valve opening provided in said pressure relief conduit;

a valve housing provided on said pressure relief conduit in communication with said valve opening;

a substantially arcuate valve body pivotally mounted in said valve housing and sealingly engaging said valve opening;

wherein said valve body is capable of pivoting through said valve opening between a first position for closing said conduit interior of said pressure relief conduit and a second position for opening said conduit interior of said pressure relief conduit;

a bias mechanism carried by said valve housing and operably engaging said valve body for biasing said valve body in said first position, whereby said valve body pivots from said first position to said second position against said bias mechanism and opens said pressure relief conduit responsive to a threshold magnitude of the pressure against said valve body;

a valve magnet provided on said valve body; and a housing magnet provided on said valve housing for attracting said valve magnet and biasing said valve body in said second position.

22. A pressure relief valve for releasing pressure from a system, comprising:

a pressure relief conduit for fluid communication with the stem and having a conduit interior for receiving the pressure and a valve opening provided in said pressure relief conduit;

a valve housing provided on said pressure relief conduit in communication with said valve opening;

a substantially arcuate valve body pivotally mounted in said valve housing and sealingly engaging said valve opening, said valve body having a curved exterior surface and a curved interior surface;

a controller pin having a rear end provided on said curved interior surface of said valve body;

wherein said valve body is capable of pivoting through said valve opening between a first position for closing said conduit interior of said pressure relief conduit and a second position for opening said conduit interior of said pressure relief conduit;

a bias mechanism carried by said valve housing and operably engaging said valve body for biasing said valve body in said first position;

a valve guide roller provided on said valve housing and engaging said exterior surface of said valve body;

a pressure roller engaging said controller pin of said valve body for traversing said controller pin as said valve body pivots between said first position and said second position, with said pressure roller engaging said rear end of said controller pin when said valve body is in said first position; and a pressure adjustment mechanism provided on said valve housing and operably engaging said pressure roller for biasing said pressure roller against said controller pin, whereby said valve body pivots from said first position to said second position against said bias mechanism and said pressure roller traverses said controller pin and said valve body opens said pressure relief conduit responsive to a threshold magnitude of the pressure against said valve body.

* * * * *